(12) United States Patent
Bustos et al.

(10) Patent No.: US 12,584,839 B2
(45) Date of Patent: Mar. 24, 2026

(54) POINT-OF-USE DEVICES AND METHODS FOR DETERMINING RHEOLOGICAL PROPERTIES OF SAMPLES

(71) Applicant: Massachusetts Institute of Technology, Cambridge, MA (US)

(72) Inventors: Nicole Alejandra Bustos, Cambridge, MA (US); Lydia Bourouiba, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 472 days.

(21) Appl. No.: 17/864,349

(22) Filed: Jul. 13, 2022

(65) Prior Publication Data

US 2023/0026439 A1 Jan. 26, 2023

Related U.S. Application Data

(60) Provisional application No. 63/221,079, filed on Jul. 13, 2021.

(51) Int. Cl.
*G01N 11/00* (2006.01)
*G01N 11/08* (2006.01)

(52) U.S. Cl.
CPC ........ *G01N 11/08* (2013.01); *G01N 2011/008* (2013.01)

(58) Field of Classification Search
CPC ........................... G01N 11/08; G01N 2011/008
USPC ........................................................ 73/54.09
See application file for complete search history.

(56) References Cited

U.S. PATENT DOCUMENTS

| | | | |
|---|---|---|---|
| 3,766,773 A | 10/1973 | Limpert | |
| 6,535,284 B1 * | 3/2003 | Hajduk ................. | G01N 21/21 |
| | | | 356/244 |
| 6,711,940 B2 | 3/2004 | James et al. | |
| 6,711,941 B2 | 3/2004 | Braithwaite et al. | |

(Continued)

FOREIGN PATENT DOCUMENTS

| | | |
|---|---|---|
| CN | 110146413 A | 8/2019 |

OTHER PUBLICATIONS

Capillary Breakup Extensional Rheometer (CaBER®) device from Cambridge Polymer Group. See https://www.campoly.com/cpg-services/electronics-and-hardware/instruments/caber/ (last accessed Oct. 30, 2023).

(Continued)

*Primary Examiner* — Peter J Macchiarolo
*Assistant Examiner* — Rodney T Frank
(74) *Attorney, Agent, or Firm* — Barnes & Thornburg LLP

(57) ABSTRACT

Apparatuses and methods designed to allow for on-site, on-demand measurement of rheological properties of a sample are disclosed. The apparatuses and methods utilize both a visual component (e.g., a camera) to obtain information about the sample for making such rheological property determinations and an integrated electrical circuit to apply a current to the sample for also making such rheological property determinations. The application of the current is done in a manner such that a thinning behavior of the sample is unaffected. Further, the apparatuses are configured in a manner that allow them to be portable so that samples can be analyzed shortly after they are received, at a point-of-use. Various configurations and methods associated with such apparatuses are also disclosed.

18 Claims, 11 Drawing Sheets

(56) References Cited

U.S. PATENT DOCUMENTS

| | | |
|---|---|---|
| 9,962,673 B2 | 5/2018 | Beck et al. |
| 10,386,282 B2 | 8/2019 | Colomer Farrarons et al. |
| 2002/0116987 A1* | 8/2002 | Braithwaite ............. G01N 3/08 |
| | | 73/54.01 |
| 2008/0134765 A1 | 6/2008 | Baek |

OTHER PUBLICATIONS

Cambridge Trimaster Device presentation from Malcolm Mackley. See https://www.malcolmmackley.com/apparatus/cambridge-trimaster/ (last accessed Oct. 30, 2023).

Charalampous, et al., "Comparative measurement of the breakup length of liquid jets in airblast atomisers using optical connectivity, electrical connectivity and shadowgraphy," Measurement: Journal of the International Measurement Confederation, 89, 288-299 (2016).

Collett, et al., "A portable extensional rheometer for measuring the viscoelasticity of pitcher plant and other sticky liquids in the field," Plant Methods, 11(1), 16 (2015).

Cooper-White, et al., "Drop formation dynamics of constant low-viscosity, elastic fluids," Journal of Non-Newtonian Fluid Mechanics, 106(1), 29-59, (2002).

Dinic, et al., "Macromolecular relaxation, strain, and extensibility determine elastocapillary thinning and extensional viscosity of polymer solutions," Proceedings of the National Academy of Sciences of the United States of America, 116 (18), 8766-8774, (2019).

Dinic, et al., "Extensional Relaxation Times of Dilute, Aqueous Polymer Solutions," ACS Macro Letter, 4, 7, 804-808, (2015).

Filament Stretching Extensional Rheometer (FISERTM) device from Cambridge Polymer Group. See https://www.campoly.com/cpg-services/electronics-and-hardware/instruments/fiser/#:~:text=CaBER%C2%AE-,FISER%E2%84%A2,exerted%20on%20the%20end%2Dplate (last accessed Oct. 30, 2023).

Galindo-Rosales, et al., "Microdevices for extensional rheometry of low viscosity elastic liquids: a review," Microfluidics and Nanofluidics. 14, 1-19, (2013).

Greiciunas ,et al., "Design and operation of a Rayleigh Ohnesorge jetting extensional rheometer (ROJER) to study extensional properties of low viscosity polymer solutions," Journal of Rheology, 61(3), 467-476, (2017).

Hallmark, et al., "A portable and affordable extensional rheometer for field testing," Measurement Science and Technology, 27(12), (2016).

Marshall, et al., "Extensional rheometry with a handheld mobile device," Experiments in Fluids, 58(6), 1-9, (2017).

Mathues, et al., "CaBER vs ROJER—Different time scales for the thinning of a weakly elastic jet," Journal of Rheology, 62(5), 1135-1153, (2018).

McDonnell, ,et al., "ADMIER-ing thin but complex fluids." Smart Nano-Micro Materials and Devices. vol. 8204. SPIE, 2011.

McKinley, "Visco-elasto-capillary thinning and break-up of complex fluids," Rheology Reviews, 3(05), 1-48, (2005).

McKinley, et al., "How to extract the Newtonian viscosity from capillary breakup measurements in a filament rheometer," Journal of Rheology, 44(3), 653-670, (2000).

Rothstein, et al., "Inhomogeneous transient uniaxial extensional rheometry," Journal of Rheology, 46(6), 1419-1443, (2002).

Rubio, et al., Breakup of an electrified viscoelastic liquid bridge, Physical Review E, 102(3), 33103, (2020).

Sadek, et al., "Capillary breakup extensional electrorheometry (CaBEER )," Journal of Rheology, 64(1), 43-54, (2020).

Sadek, et al., "Capillary Breakup Extensional MagnetoRheometry," Journal of Rheology 64(1), 55-65, (2020).

Sharma, et al., "The rheology of aqueous solutions of ethyl hydroxy-ethyl cellulose (EHEC) and its hydrophobically modified analogue (hmEHEC): Extensional flow response in capillary break-up, jetting (ROJER) and in a cross-slot extensional rheometer," Soft Matter, 11(16), 3251-3270, (2015).

Tirtaatmadja, et al., "Drop formation and breakup of low viscosity elastic fluids: Effects of molecular weight and concentration," Physics of Fluids, 18(4), (2006).

Tuladhar, et al., "Filament stretching rheometry and break-up behaviour of low viscosity polymer solutions and inkjet fluids," Journal of Non-Newtonian Fluid Mechanics, 148, 97-108, (2008).

Weickgenannt, et al., "Pinch-off of a stretching viscous filament and drop transport," New Journal of Physics, 17(8), (2015).

Wouter, et al., "CaBER vs ROJER—Different time scales for the thinning of a weakly elastic jet," Journal of Rheology, 62(5), 1135-1153, (2018).

Yan, et al., "Drop-on-demand drop formation of polyethylene oxide solutions," Physics of Fluids, 23(10), (2011).

* cited by examiner

POINT-OF-USE DEVICES AND METHODS FOR DETERMINING RHEOLOGICAL PROPERTIES OF SAMPLES

CROSS-REFERENCED TO RELATED APPLICATIONS

This application claims the benefit of U.S. Provisional Application No. 63/221,079, filed on Jul. 13, 2021, and entitled "Point-of-Use Devices and Methods for Determining Rheological Properties of Samples," the entire content of which is hereby incorporated by reference in its entirety.

FIELD

The present disclosure relates to methods and apparatuses for measuring extensional rheological properties and the electrical conductivity of a fluid, and more specifically relates to devices designed to be used with perishable samples (i.e., samples that degrade). The methods and apparatuses disclosed can be used in various settings including pharmacology, food safety, field sampling, and healthcare settings, among others, where sending samples for analysis with current state of the art laboratory instruments, which are cumbersome, is not possible and/or leads to inaccurate results due to the degradation of samples.

BACKGROUND

Extensional rheology is the study of the deformation of a material under conditions of pure strain. The on-site rheological characterization of complex fluids is important for a number of industrial, medical, and academic applications. Typically, laboratory-based rheometers are used to characterize rheological properties of a fluid, which include relaxation time, extensional viscosity, and shear viscosity. However, obtaining such measurements can be challenging because some samples, such as mucosalivary fluid, are collected in small quantities and may degrade over time and therefore do not retain their natural properties after collection and transport.

Extensional-free simple shear flows can be readily generated in cone-and-plate or Couette geometries on a torsional rheometer to measure the shear rate dependent shear viscosity. Similarly, the extensional viscosity of a complex fluid can be measured in a shear free, purely extensional deformation using an imposed extensional rate. There are various techniques and devices, sometimes referred to as rheometers, that can be used for studying extensional rheology. Each technique, however, has its drawbacks.

The stretching of a filament or capillary breakup is a laboratory technique incorporated in devices such as a Filament Stretching Extensional Rheometer, also referred to as a FiSER or FiSER device (Cambridge Polymer Group, Boston), a Capillary Breakup Extensional Rheometer, also referred to as a CaBER or CaBER device (Cambridge Polymer Group, Boston and Haake), and the Cambridge Trimaster device. These devices measure the necking of an extensionally-strained fluid filament as a function of time. A small sample of test fluid is loaded between two parallel plates, which are then drawn apart by applying a uniaxial extensional step-strain. As the sample is stretched, a filament is formed, which then subsequently thins and breaks. The profile of the thread evolves under the action of capillary pressure and the necking of the liquid filament is resisted by a combination of viscous and elastic stresses in the fluid thread. The thinning process is monitored and the evolution of the diameter of the filament over time holds the information on the material properties of the sample (e.g., Newtonian, viscoelastic). The elastic contributions of viscoelastic fluids are described by the relaxation time of the fluid, which is the time needed for the polymer molecules to adjust to a change in strain.

The practical limit to achieve a measurement of extensional properties is restricted by the time to stretch the liquid and form the liquid bridge, which is not a suitable choice for low viscosity fluids. Inertial effects are worse for low viscosity fluids when using a capillary break-up technique utilized by FiSER and CaBER devices. By way of example, the plate separation takes a minimum of 50 ms in the commercial CaBER device. The CaBER device can measure relaxation times in the range of 0.01 seconds to 1 second. The standard technique, however, fails if either the Ohnesorge number (Oh, ratio of viscous to inertial and surface tension forces) or Deborah number (De, ratio of relaxation to capillary timescales) are less than unity. This is associated with the fluid losing cohesion at the end of plates or the fluid filament necking too rapidly with respect to the observation timescale of its breakup.

A further limitation of the CaBER device is that it typically uses a laser micrometer to monitor the filament thinning. This can be an expensive method to implement and prevents direct visualization of filament behavior. High speed cameras can also be used in conjunction with backlighting to visualize the edge contours of the thinning filament. However, this may also be an expensive and difficult setup to transport. In addition to suffering from the low viscosity fluid complications that a CaBER device, the FiSER device is limited to a smaller extensional rate range and tests fluids of higher viscosity due, at least in part, to the limited sensitivity of the force transducer that limits analysis of fluids with very low viscosity.

A device like the Cambridge Trimaster device can operate at lower extensional times and can be smaller than the CaBER device, but it also limited in its ability to easily handle lower viscosity fluid. This is because a constant and fundamental physical limit in lower viscosity fluid is the influence of fluid inertia in stretching of a filament. When there are strong inertial effects, the position of the narrowest part of the filament does not necessarily match with the position of the laser micrometer. For these reasons, the use of high-speed cameras to record the filament necking process is a complementary technique for evaluating extensional properties of low viscosity fluid and for extending the limits of reliable CaBER device operation.

In some embodiments, "cells" or "fixtures" are used to adapt to the commercial CaBER device, in turn allowing the analysis of complex fluids under simultaneous application of an extensional flow and an electric field or magnetic field. These adaptable devices are sometimes referred to as Capillary Breakup Extensional Electrorheometry or Electrorheometers, also referred to as CaBEER or CaBEER devices, or Capillary Breakup Extensional Magnetorheometry or Magnetorheometers. To date, the integration of an electric field was motivated to study electrorheological fluids (ERFs). ERFs are suspensions of extremely fine and electrically active particles in an electrically insulating fluid. Under the presence of an external electric field, their respective rheological properties change reversibly on the order of milliseconds. Under extensional flow and no electric field, fluids behaved as a Newtonian-like fluid, while with an imposed electric field, the filament thinning process is delayed and breakup time of the fluid increases. Notably, the magnitude of voltages used in these studies are on the order of kilovolts.

It is difficult to use classical filament stretching technique with low viscosity fluids (low Ohnesorge number) due, at least in part, to the short time, with respect to observation time, it takes for the filament to break after the plate separation ceases. The Cambridge Trimaster was developed to overcome these technical limits by means of a rapid extensional step strain to further increase the instrument upper extensional rate limit. However, the thinning process can be complicated by effects of fluid inertia that may create a challenge for accurate analysis of fluid thinning by either direct visualization (e.g., high-speed imaging) or laser micrometer.

When using techniques that involved opposing flows, such as microfluidics, a consistent supply of fluid is typically required, and can thus require large volumes and a syringe pump or the like to provide such consistent supply. Still further, using such techniques may require a new device or may at least involve the performance of a challenging decontamination process between biological samples. The use of a dripping technique, such as optically-detected elastocapillary self-thinning dropping-onto-substrate, also referred to as an ODE-DOS technique, also requires the use of a consistent supply of fluid, and further, requires direct visualization, such as use of a high speed camera and/or digital single-lens reflex (DSLR) camera. Finally, jetting techniques, which can use a Rayleigh Ohnesorge Jetting Extensional Rheometer, also referred to as a ROJER or ROJER device, also require the use of a consistent supply of fluid (and so large volumes) and direct visualization, have a limited range of viscosities, and require more decontamination and containment for biological fluids because of droplets produced from jetting. Stagnation point flows are steady extension-dominated flows that enable the control of the local strain rate and total accumulated strain. These types of flows can be generated using macroscopic techniques such as four-roll mills and opposed jet or cross-slot devices and higher extensional rates can be accessed by using microfluidic devices. This enables the use of rheo-optical methods for visualizing flow kinematics and polymer orientation. Additionally, the inherent small length scales of the microfluidic device and lower flow rates allow measurements to be extended to high extensional rates.

To the extent electric fields have been used in conjunction with fluid characterization, the motivation has typically been used to measure electrical conductivity when a microscopic structure of the liquid is altered by polymer stretching, and to measure the extensional relaxation time when the liquid is subject to a strong electric field. High voltages applied in polymeric solutions, however, can significantly increase the filament temperature as the filament thins and subsequently damage polymers and change the fluid properties.

Accordingly, there is a need for portable devices that can provide rapid analysis and results of rheological properties of a fluid on-site and on-demand.

SUMMARY

The present disclosure describes methods and flexible portable devices for measuring extensional rheological properties of a fluid. The disclosed new methods use an integrated circuit system to relate the time evolving resistance and voltage during extension of a fluid sample to extensional rheological properties of a fluid, in addition to providing direct visualization of a fluid sample thread during the filament thinning process by the use of a handheld and calibration-free device.

One distinction that exists between previous rheometers and those provided for herein is that the techniques and apparatuses of the present disclosure measure resistance and/or apply a current to a sample under test in a capillary break up rheometer. Any previous uses of current or magnetic field in conjunction with a rheometer are not used to directly measure relaxation time or break up time of a fluid thread (i.e., elapsed time for a stretched fluid to break after stretching). Further, to the extent previous disclosures hint at or suggest using electric fields to characterize fluids, such disclosures appear to use electrical conductivity to measure the break length of liquid jets in airblast atomisers, for example. As noted above, high voltages applied in polymeric solutions can significantly increase the filament temperature as the filament thins and subsequently damage polymers and change its properties—all undesirable results that can occur in view of prior teachings.

In one aspect an apparatus for measuring rheological properties is disclosed that includes a sample analyzer, a camera and/or camera receiver, a light source and/or light source receiver, an integrated electrical circuit, and a controller. The example analyzer is configured to handle a sample in a manner that allows rheological properties of the sample to be analyzed. The camera, when it is provided as part of the apparatus, is configured to observe the sample being analyzed. The camera receiver, when it is provided as part of the apparatus, is configured to position a camera to observe the sample being analyzed. In other words, the camera receiver can be provided as part of the apparatus while a camera is separately provided and received by the camera receiver. Alternatively, the camera and the camera receiver are both provided as part of the apparatus. Further alternatively, the camera is provided as part of the apparatus regardless of whether the apparatus has a designated camera receiver to receive the camera.

Similarly, the light source, when it is provided as part of the apparatus, is configured to direct light towards the sample to be analyzed. The light source receiver, when it is provided as part of the apparatus, is configured to position a light source to direct light towards the sample to be analyzed. In other words, the light source receiver can be provided as part of the apparatus while a light source is separately provided and received by the light source receiver. Alternatively, the light source and the light source receiver are both provided as part of the apparatus. Further alternatively, the light source is provided as part of the apparatus regardless of whether the apparatus has a designated light source receiver to receive the light source.

The integrated electrical circuit is configured to apply a current through the sample. The controller is configured to perform at least two functions. First, it is configured to instruct data indicative of rheological properties of the sample being handled be determined by the camera provided as part of the apparatus or a camera associated with the camera receiver provided as part of the apparatus, and/or it is configured to receive data indicative of rheological properties of the sample being handled from the camera or camera associated with the camera receiver. Second, it is configured to instruct data indicative of rheological properties of the sample being handled be determined based on the current applied to the sample by the integrated electrical circuit and/or it is configured to receive data indicative of rheological properties of the sample being handled based on the current applied to the sample by the integrated electrical circuit.

Any of a variety of alternative or additional features can be included and are considered within the scope of the present disclosure. For example, in some embodiments, the sample analyzer can include a capillary break-up device. Likewise, in some embodiments, the sample analyzer can include a linear actuator system. The linear actuator system can include, by way of non-limiting example, a first plate and a second plate moveable axially away from the first plate. The first and second plate can be configured to receive the sample between the two places such that as the second plate moves axially away from the first plate, the sample stretches. In at least some such embodiments, the linear actuator system can be configured to stretch the sample until it breaks. Furthermore, in embodiments designed such that the sample is stretched until it breaks, the controller can be configured to detect that the sample breaks in response to a detected voltage and/or a current reading associated with the integrated electrical circuit. Alternatively, or additionally, the controller can be configured to stop movement of the second plate relative to the first plate in response to the sample breaking. In at least some embodiments, the linear actuator system can be configured to stretch the sample until a predetermined gap is formed between the two plates.

The light source(s) can be incorporated in a camera, whether that camera is part of the apparatus or is received by the camera receiver. The apparatus can include a housing. The sample analyzer can be disposed in the housing. In at least some such embodiments, the housing can be at least one of slidable or removable such that the sample analyzer can be accessed to remove and replace the sample and a new sample can be analyzed.

The integrated electrical circuit can be configured such that the current applied through the sample fails to alter a thinning behavior of the sample. The controller can be further configured to determine one or more rheological properties of the sample being handled. This can be achieved, for example, based on the data generated from the camera and/or camera received by the camera receiver and the data generated from the integrated electrical circuit. The controller can be further configured to determine one or more rheological properties of the sample being handled based on measured break-up times of the sample being handled.

The apparatus can be sized to be portable. For example, a height of the apparatus can be no more than three times as tall as a height of a typical smartphone, i.e., it can not exceed more than about 20 inches.

A system for measuring rheological properties is also included as part of the present disclosure. The system include the apparatus as described above, in any possible configuration, and an application that is configured to communicate with the controller and allow for use of the apparatus without any calibration being performed by a user of the system. In at least some embodiments, the application can be configured to set an image calibration associate with the camera and/or a camera associated with the camera receiver based on dimensions associated with one or more components of the sample analyzer. The components can be, for example, first and second plates, with the second plate being moveable axially away from the first plate and the first and second plates being configured to receive the sample between them such that as the second plate moves axially away from the first plate, the sample stretches. The dimensions associated with the one or more components of the sample analyzer can include a radius of each of the plates. Still further, the controller and/or the application can be configured to provide rea-time adjustments of extensional velocity associated with the sample analyzer based on at least one of: (a) data received from the camera and/or a camera associated with the camera receiver; (b) data received from the integrated electrical circuit; and/or (c) data already stored in the controller and/or the application related to the same.

In another aspect, a method of measuring rheological properties of a sample is disclosed that includes obtaining one or more images of a sample being stretched, applying a current through the sample being stretched, and determining one or more rheological properties of the sample based on both the one or more obtained images and the applied current.

In some embodiments, the obtaining and applying actions can occur simultaneously. Applying a current through the sample being stretched can fail to alter a thinning behavior of the sample. The method can further include stretching the sample. For example, the method can further include stretching the sample until it breaks. Some such embodiments can include stopping a sample analyzer configured to stretch the sample once the sample breaks. Stopping the sample analyzer can include stopping the sample analyzer in response to a detected voltage or current reading associated with the sample.

The method can further include determining one or more rheological properties of the sample based on measured break-up times of the sample. The action of determining one or more rheological properties of the sample based on both the one or more obtained images and the applied current can occur without any calibration being performed by a use of the method prior to or during the method. In at least some embodiments, the method can also include automatically setting an image calibration associated with a camera used to perform the action of obtaining one or more images of the sample being stretched. This action of automatically setting an image calibration associated with a camera can be based on one or more dimensions associated with one or more components of a sample analyzer used to stretch the sample. For example, when the one components of the sample analyzer include two opposed plates, the dimension(s) can include radii of the two opposed plates. In at least some embodiments, the method can include receiving a device configured to stretch the sample at a location at which the sample is taken. Such a device can have a height, for example, that does not exceed more than three times a height of a typical smartphone, i.e., is no more than about 20 inches tall.

Any of the features or variations described herein can be applied to any particular aspect or embodiment of the present disclosure in a number of different combinations. The absence of explicit recitation of any particular combination is due solely to avoiding unnecessary length or repetition.

BRIEF DESCRIPTION OF DRAWINGS

This disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, the present disclosure includes some illustrations and descriptions that include prototypes, bench models, or schematic illustrations of set-ups. A person skilled in the art will recognize how to rely upon the present disclosure to integrate the techniques, systems, devices, and methods provided for into a product and/or analysis method, such as a portable rheometer device capable of being used on-demand and on-site where a fluid being analyzed is obtained.

Figure 1A:
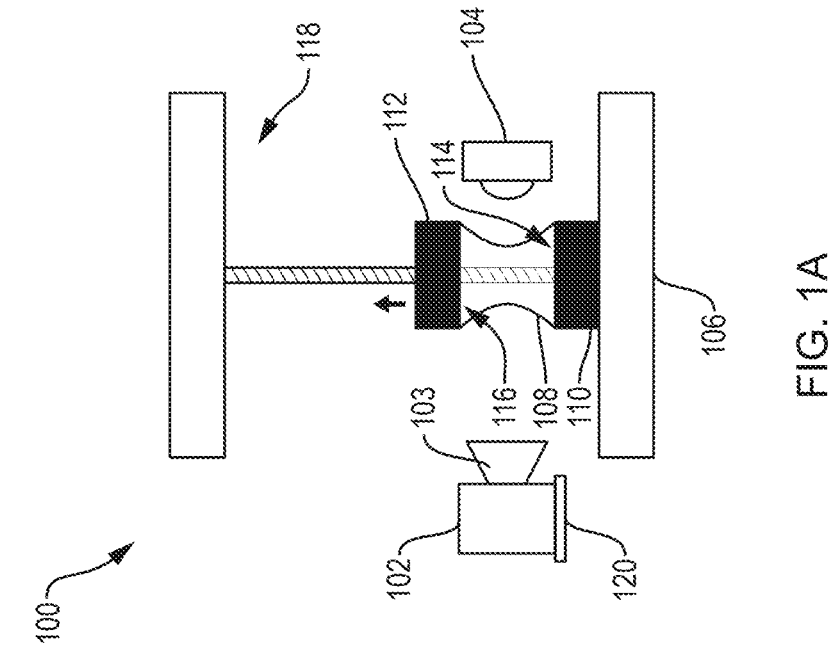
FIG. 1A is a schematic side, partially transparent view of one embodiment of a rheometer apparatus for measuring extensional rheological properties in accordance with the present disclosure.

In consideration of the advantages and disadvantages of various techniques and devices, the method of capillary break-up provided for herein was determined to be the most practical for handling small sample volumes, easy decontamination, and could be modified into a transportable device, referred to herein as a rheometer apparatus. FIG. 1A illustrates one exemplary, non-limiting embodiment of such an apparatus 100, also referred to as a device or transportable device, that is capable of measuring extensional rheological properties. As provided for herein, these properties include, but are not limited to, a relaxation time of viscoelastic fluids. The apparatus 100 includes a handheld device camera 102 with optics and aligned with a backlight source 104 and stage 106 where a filament or sample 108 is stretched by action of, by way of a non-limiting example, a linear actuator system 118. The sample 108 can be received by first and second plates 110, 112, and more specifically by opposing surfaces 114, 116, of the plates 110, 112, respectively. The plate surfaces 114, 116 can be vertically aligned and adapted for axial motion to vary the height between the opposed surfaces. For example, the illustrated linear actuator system 118 can include a threaded shaft 117 on which the plates 110 and 112 can be disposed, the threaded shaft 117 being movable by a motor 119 that can cause the plate 112 to move axially (as shown, vertically upwards, towards the motor 119) away from the plate 110, in turn causing the sample to stretch and form a liquid bridge. The stretching can continue until the sample breaks. Alternatively, the linear actuator system 118 can be operated until a predetermined gap is formed between the first plate 110 and the second plate 112 such that the sample does not necessarily break. A person skilled in the art will appreciate other actuation systems that can be used to advance one plate away from another, and the linear actuator system 118 is by no means limiting. Other known mechanical, electrical, and/or magnetic drives can be used to move one component with respect to another to stretch and/or break the sample.

Figure 1B:
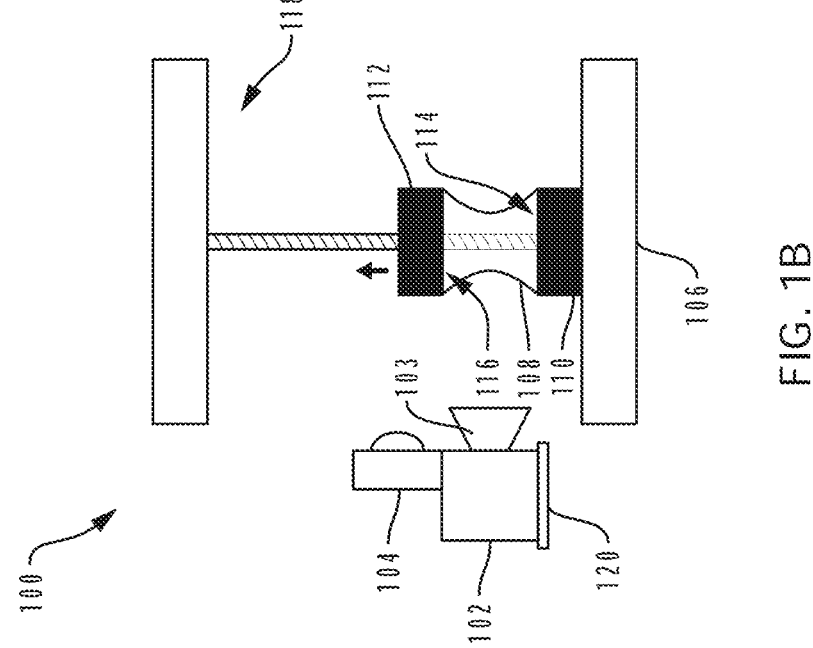
FIG. 1B is a schematic side, partially transparent view of another embodiment of a rheometer apparatus for measuring extensional rheological properties in accordance with the present disclosure.

In some embodiments, the apparatus 100 includes a camera receiver 120 to position the camera 102 to observe the sample 108 to be analyzed. The camera receiver 120 can be any structure capable of maintaining a camera at a desired position, including but not limited to a stand, a table, a shelf, a tripod, a stabilization device, or other structures known to those skilled in the art. In some embodiments, the backlight source 104 can be incorporated to be part of the camera 102 or the camera received by the camera receiver 120, as shown in FIG. 1B. Alternatively, a light source receiver (not shown) can be utilized in a similar manner as a camera receiver, and can thus be similarly constructed, though a camera receiver and a light source receiver do not have to be of a similar construction.

The handheld device camera 102 can be a smartphone, for example, an iPhone (in some instances, a model 8 with iOS 13.1.1 was utilized, but many different iPhone models, as well as models from other manufacturers, can also be used). An additional optic 103 can be coupled to or otherwise associated with the smartphone. The added optics can extend the resolution of the handheld device camera 102 down to about 10 microns. Cameras and/or optics having an even better resolution can also be used, allowing for the resolution to extend to even better than 10 microns. In at least some embodiments, the added optics can extend the resolution of the handheld device camera 102 within comparable resolution of a Haake CaBER device. The lens used to extend the iPhone resolution can be, by way of non-limiting example, a plano-convex lens with focal length 60 mm. The lens can be secured to the iPhone camera using, for example, a 3D-printed lens holder in the shape of, for example, a ring that can be flush with the back of the camera. Additionally, the handheld device camera 102 can be protected from the sample loading platform. The use of an app (i.e., mobile application) or other portable and flexible analysis platform can enable the user to be blind to calibration, essentially obtaining a calibration-free setting from the point of view of the user. Such a feature is similar to an auto-focus in digital cameras, in which the user does not need to touch the lens, or make calibrations, to achieve optimal focus. For example, in embodiments in which a radius, or other related geometric parameter, of the cylindrical plates 110 and 112 is known, the app can, by way of example, set the image calibration for a conversion between pixels and millimeters, or another specified metric. The interface with an app or other flexible platform enables the user to store collected data and have instant measurements to make proper parameter adjustments of extensional velocity. The app can be run, for example, on a smartphone or other computing device, including but not limited to on the camera 102 and/or another smartphone and/or computing device (see the personal computer 417 of FIG. 5B).

Figure 2:
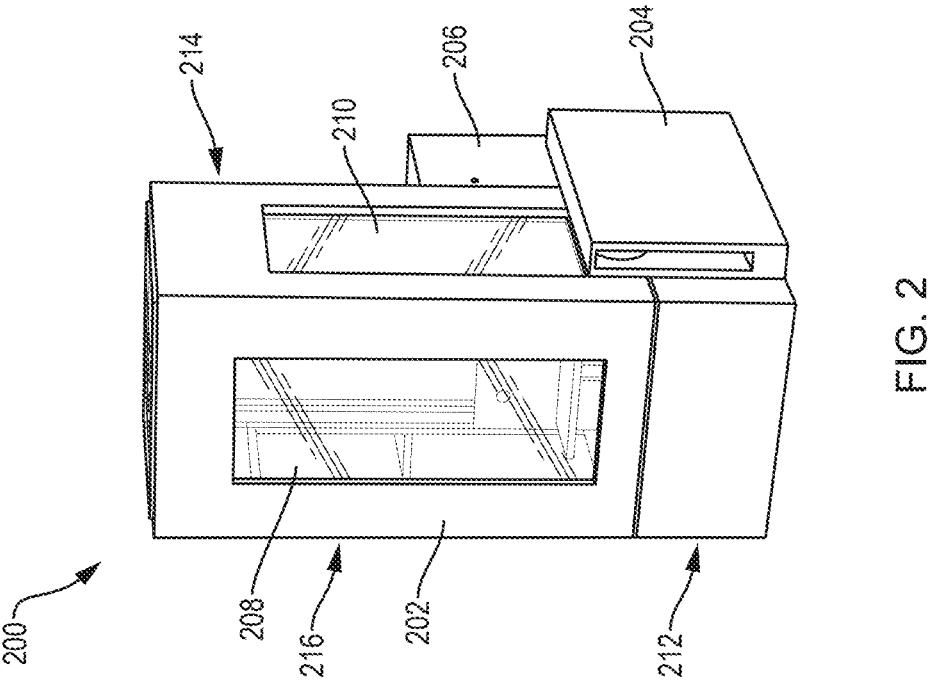
FIG. 2 is a perspective view of one embodiment of a portable rheometer with a protective housing.

FIG. 2 shows system 200 for the apparatus 100. A person skilled in the art, in view of the present disclosures, will appreciate that some features of the apparatus 100 can alternatively be part of the system 200, and likewise, some features of the system 200 can be part of the apparatus 100. In the illustrated embodiment, the system 200 includes a main housing 202. The main housing 202 can be used to have aspects of the apparatus 100, such as the stage 106, plates 110, 112, linear motor system 118, light source 104, and/or light source receiver, disposed therein. In some embodiments, the camera 104 and/or camera receiver 120 can also be provided in the main housing 202. The main housing 202 can be slidable or removable such that the stage 106 and plates 110, 112 can be accessed to remove and replace the sample and a new sample can be analyzed. The main housing 202 can also include one or more transparent panels, as shown panels 208 and 210, to allow for clear, direct visualization of the components disposed in the main housing 206 and the tests being performed therein. This can allow for imaging or lighting to be performed and/or provided from outside of the main housing 202, for example from a front 212 (the side having the text in the bottom-right corner of FIG. 2) or sides 214 and 216 (the side 214 having an auxiliary housing 204 attached thereto; the side 216 being opposed to the side 214) of the housing 202. The main housing 202 can allow for containment of fluid samples (i.e., from droplet fragmentation). In some embodiments, the main housing 202 can be removable to allow for proper cleaning of surfaces after testing of biological samples.

Further, the main housing 202 can include one or more auxiliary housings, as shown a camera or phone housing 204 and an electronics housing 206. The camera housing 204 can receive a camera or smartphone, such as the camera 102, with optics that can be aligned with a backlight source, like the light source 104, as well as with the stage 106 and/or plates 110, 112. The camera housing 204 can be the receiver 120 and/or include the receiver 120. The camera housing 204 can move with respect to the main housing 202 to allow it to be positioned at a desired location with respect to the main housing 202 and/or the components associated therewith (e.g., the light source 104, the stage 106, and/or the plates 110, 112). In some embodiments, the camera housing 204 can be attached to and removed from the main housing 202 to cover and protect the camera or the like. The electronics housing 206 can include electronics of the apparatus 100, such as an integrated electrical circuit, as discussed below. In the illustrated embodiment, the electronics housing 206 can be disposed on a back of the housing (opposed to the front 212). The electronics can include a controller, such as one described below for implementing various techniques provide for in the present disclosure, communications components for communicating with carious components of the apparatus 100 (e.g., the camera 102, the light source 104, the linear actuation system 118, etc.) and/or for communicating data related to the apparatus 100 or system 200.

The system 200, including the housings 202, 204, and 206, can have various dimensions understood by those skilled in the art in view of the present disclosures. For example, the main housing 202 can have a length approximately in the range of about 2 inches to about 10 inches, a width approximately in the range of about 2 inches to about 10 inches, and a height approximately in the range of about 10 inches to about 25 inches, and often preferably no greater than about three times a height of a typical smartphone (which is about 6.3 inches), so preferably no greater than about 19 inches or 20 inches (rounding up from 19 inches). One system 200 used in conjunction with the present disclosure had a main housing 202 that was built to have a length and width of about 5 inches and a height of about 14 inches. By way of comparison, a CaBER device main housing typically has a length and width of about 11 inches and 15 inches, respectively, and a height of about 21 inches. The electronics housing 206 can have a length approximately in the range of about 3 inches to about 12 inches, a width approximately in the range of about 3 inches to about 12 inches, and a height approximately in the range of about 1.5 inches to about 8 inches. In the embodiment in which the main housing 202 was built to have a length and width of about 5 inches and a height of about 14 inches, the electronics housing 206 was built to have a length and width of about 6 inches and a height of about 3 inches. By way of comparison, the same CaBER device electronics housing typically has a length and width of about 9 inches and 12 inches, respectively, and a height of about 9 inches.

One non-limiting feature that sets the present rheometers apart from existing rheometers is the inclusion of an integrated electrical circuit as part of a capillary breakup design, the circuit being able to impose a current through a sample. Further, to the extent any designs previous to the present rheometers apply extensional flows and electric fields on fluids, the imposed electric fields alter the filament thinning behavior and filament thinning is solely recorded with camera imaging or a diameter measurement system.

In the present design, on the other hand, the rheometers and related designs use an applied current without perturbing, or at least minimizing perturbing, the fluids natural thinning behavior. This modality complements the capillary break up measurement by having two simultaneous methods of measurement, imaging and conductivity, for relaxation time. In cases where capillary breakup is challenging due to the low relaxation time of a fluid, estimate measurements of relaxation time can still be made by measuring the breakup time of a fluid. The liquid itself can act as a resistor in the circuit system and as the shape of the liquid thread evolves over time, so does its equivalent resistance. When the liquid filament breaks, the circuit becomes an open electrical circuit.

The apparatus 100 can stretch the liquid in two forms: 1) stretching the fluid until it breaks; or 2) stretching the fluid to a predetermined gap. In the first form, the top surface can move vertically upward at a constant extensional rate or constant velocity or acceleration until the liquid thread breaks, after which the motion can cease. The breaking of the liquid or discontinuity of the fluid from top to bottom surface can be detectable by the voltage or current readings of the integrated circuit. This can automatically shut off the axial motion, i.e., the action of the linear actuator system 118 that causes the plate 112 to move away from the plate 110. The change in resistance and potential can be monitored and recorded over time, indicating the elapsed time for the filament to break that can be related to the imposed velocity profile to additionally extrapolate the breakup length. In the second form, the fluid can be stretched to a predetermined height and the axial motion of the plates can be determined by, for example, a programmed velocity profile.

Figure 3B:
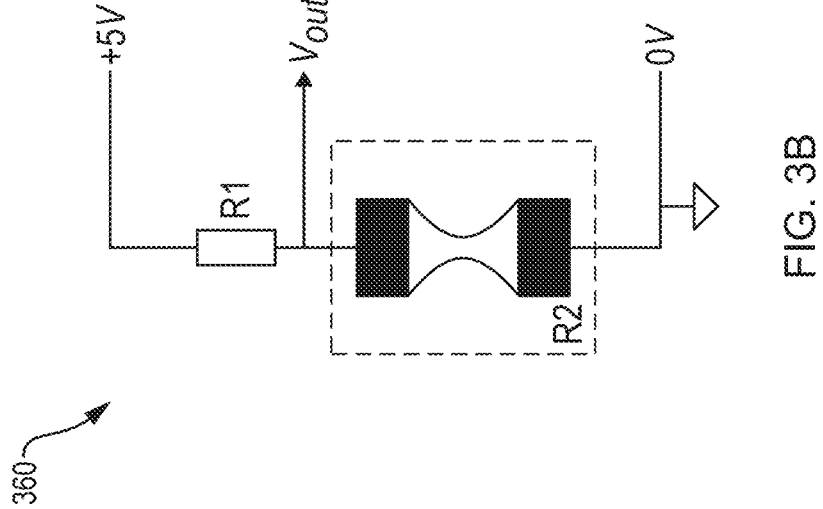
FIG. 3B is an electrical diagram of one embodiment of a voltage divider circuit with one resistor replaced by the physical fluid thread providing electrical resistance.
Figure 3A:
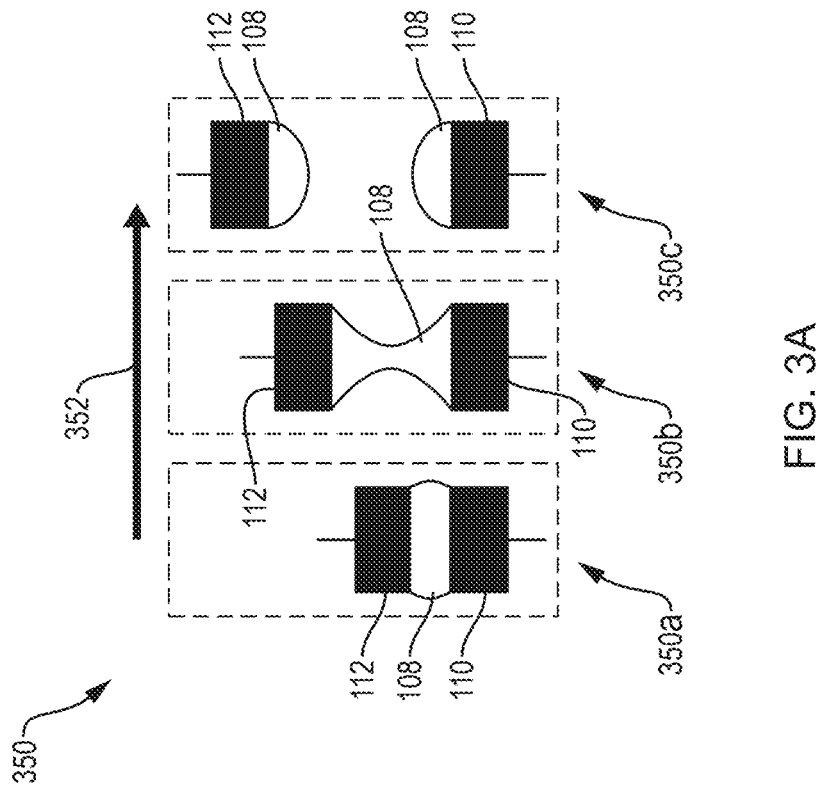
FIG. 3A is a schematic diagram of one embodiment for measuring breakup time of viscoelastic fluids in accordance with the present disclosure.
Figure 4A:
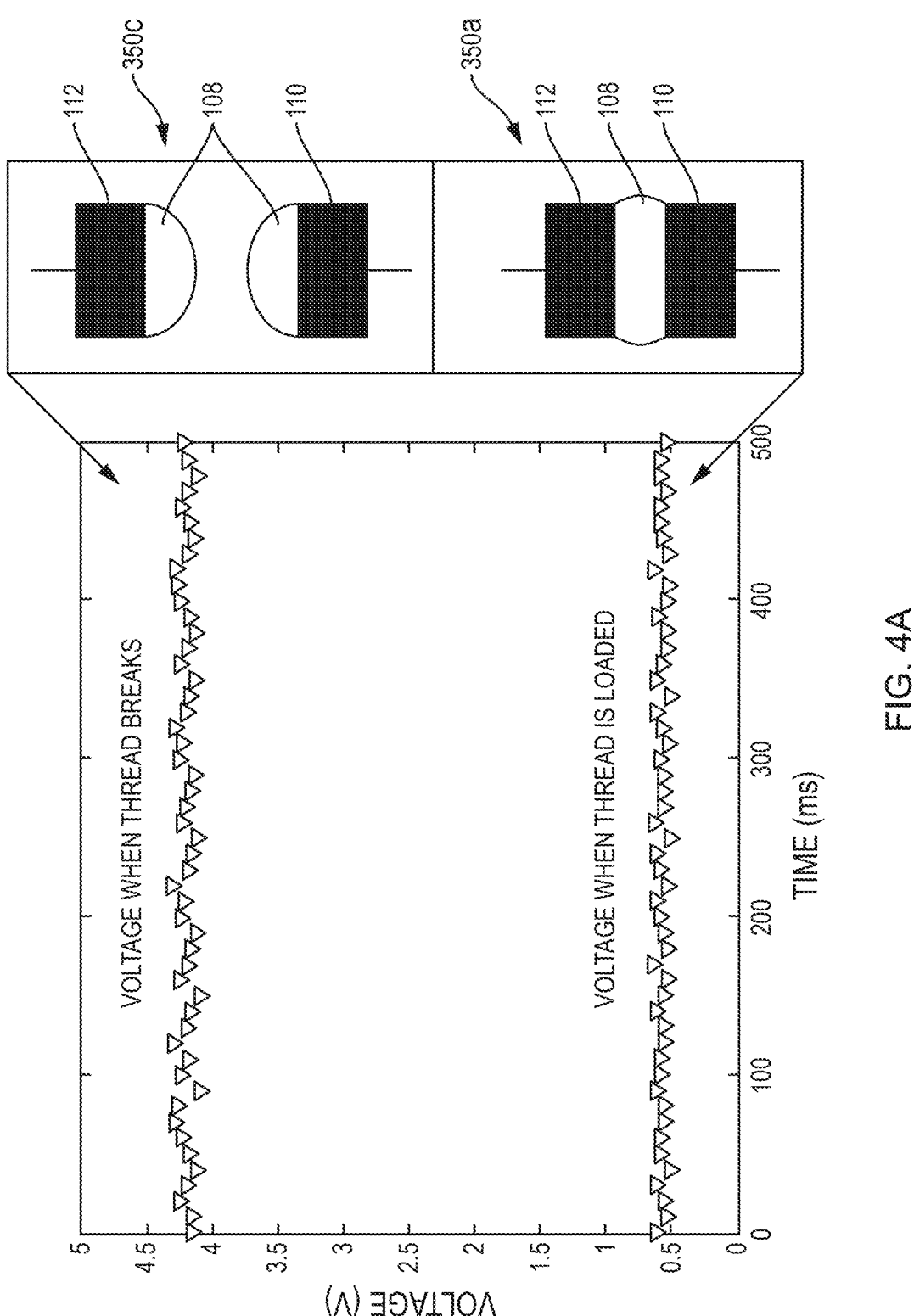
FIG. 4A is a graph depicting a voltage reading over time when a sample is loaded and when the sample thread breaks.
Figure 4B:
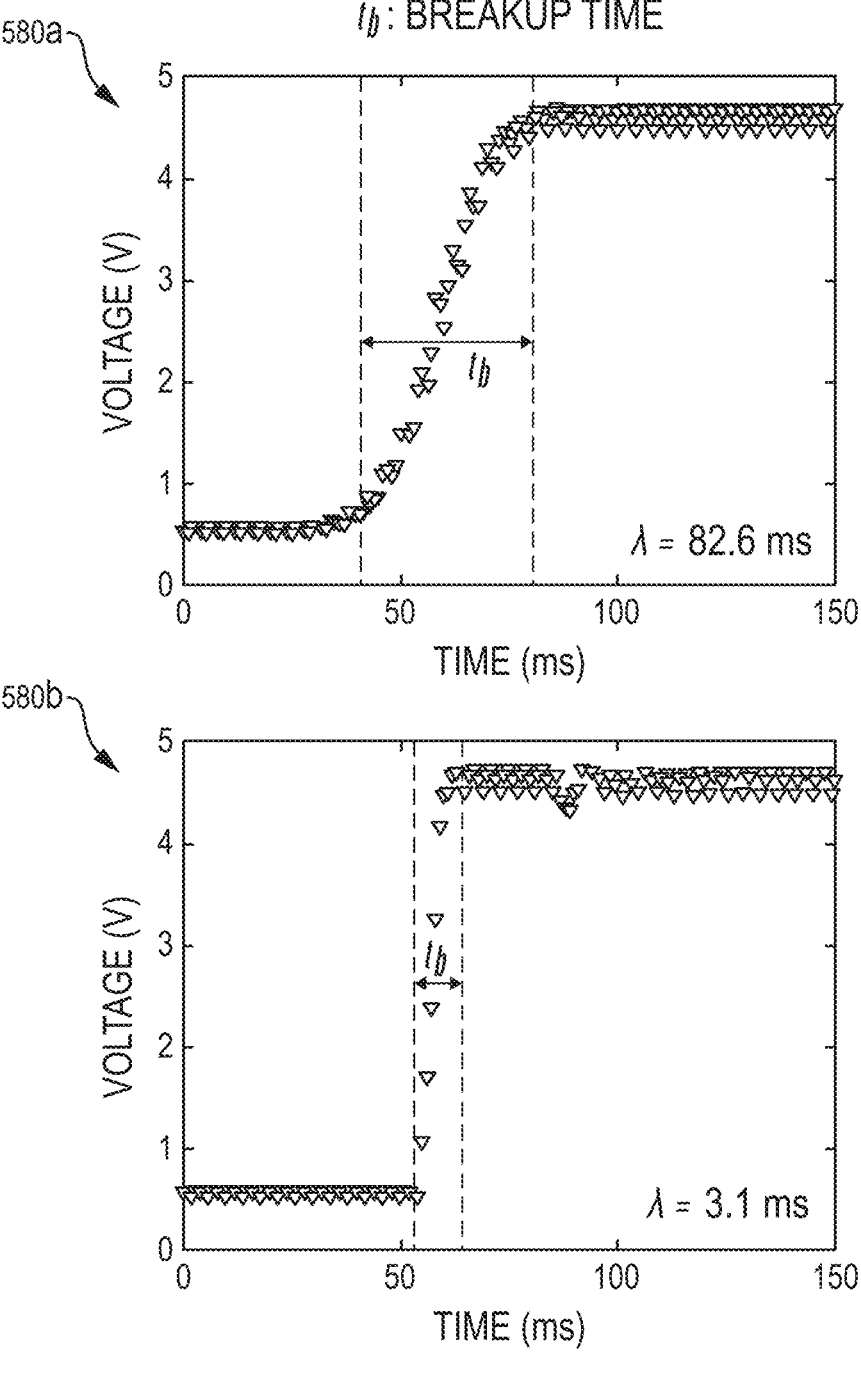
FIG. 4B provides a graph for each of two samples with different relaxation times and their measured change in voltages as they are stretched over time, with the breakup time period being indicated by a time $t_b$ disposed between the two vertical dashed lines.
Figure 5B:
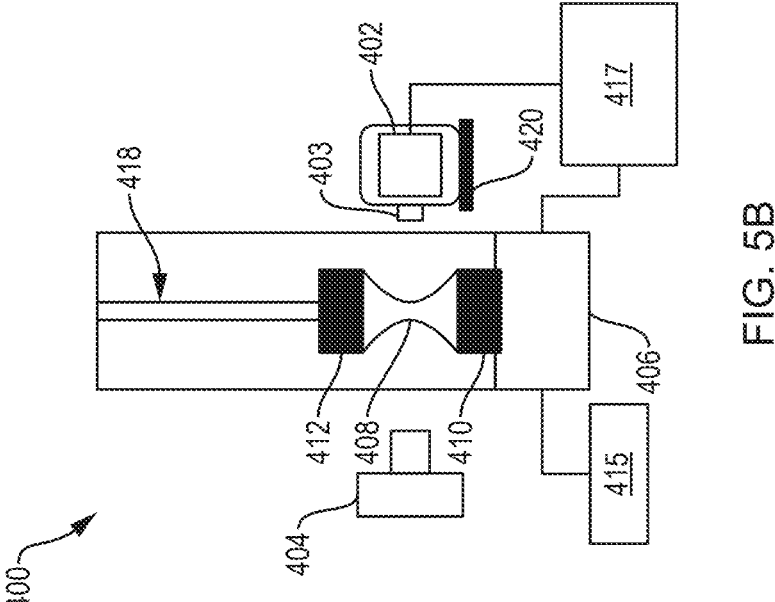
FIG. 5B is a schematic diagram of another embodiment of a rheometer apparatus (not drawn to scale)
Figure 5A:
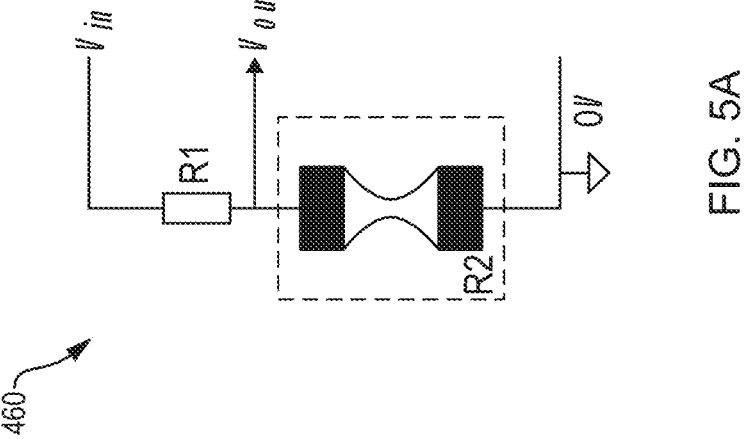
FIG. 5A is the electrical diagram of the voltage divider circuit of FIG. 3B with the voltage input being generic rather than indicated as +5 V.

The circuit can be a voltage divider circuit 360, 460 (see, e.g., FIGS. 3A-3B and 5A-5B) with a known applied voltage (see, e.g., +5 V for FIG. 3B), known resistor values, the unknown resistance between the opposed plates, and a measuring unit (e.g., voltmeter or ammeter) to measure the output voltage between the known and unknown resistors, e.g., resistors R1 and R2 (see, e.g., FIGS. 3B and 5A). The circuits 360, 460 can be integrated into rheometer apparatuses of the present disclosures, such as the rheometers 100, 400. The measuring unit can record the output voltage and can calculate the unknown resistance based on the known values of input voltage and resistance. The general concept of the voltage responses when the thread is loaded and when the thread breaks are shown in the illustration in FIGS. 3A-5B. For example, as shown in a stretching method 350 in FIG. 3A, as the plate 112 moves away from the plate 110, stretching of the sample 108 continues to occur and voltage is increasing, as illustrated by arrow 352, thus keeping a closed circuit by way of the sample 108 in a first point in time 350a and a second point in time 350b. Eventually the sample 108 breaks, as shown at a third point in time 350c, thus causing an open circuit to form. FIG. 4A illustrates the voltage reading over time when the thread is loaded, at the point in time 350a, as compared to the voltage when the thread breaks, at the point in time 350c, with the voltage being approximately 0.5 Volts in the first instance and over 4 Volts in the second instance. FIG. 4B illustrates the voltage reading over time as the fluid thread, i.e., the sample 108, is stretched, with the breakup time $t_b$ being delineated by the sections in the $t_b$ range, where the breakup time $t_b$ represents the delay between the voltage spanning a minimum range (e.g., at the first point in time 350a) and maximum range (e.g., at the third point in time 350c), as illustrated in FIG. 4A. More specifically, FIG. 4B illustrates two such examples, with the fluids having different elastic properties. The fluids are the same material, in this instance a polyethylene oxide (PEO) and water solution, but the fluids having different difference concentrations of PEO, which results in samples having different elastic properties and/or relaxation times. For example, a person skilled in the art will appreciate that a sample having a lower PEO concentration will have a lower relation time. The tested fluid in a top graph 580a has a relaxation time (λ) of 82.6 ms, while the tested fluid in a bottom graph 580b has a relaxation time (λ) of 3.1 ms. The larger relaxation time also results in a larger value of breakup time $t_b$. The voltage over time responses in graphs 580a, 580b demonstrate that testing of this nature can be used to quantify a breakup time $t_b$, which in turn can be used to distinguish elastic properties of different fluids.

FIG. 5B illustrates another embodiment of a rheometer apparatus 400 that is transportable. The apparatus 400 is similar to the apparatus 100 in that it includes a camera 402 having an additional optic 403 associate therewith, a camera receiver 420, a light source 404, a stage 406, opposed plates 410, 412 having a sample 408 disposed therebetween, and a linear actuator 418 configured to move the plate 412 with respect to the plate 410. In the illustrated embodiment, electronics (not separately delineated in the figure) are associated with the stage 406, and the electronics can operate in manners provided for herein or otherwise understood by those skilled in the art in view of the present disclosures. Further, a power source 415 is provided to power aspects of the apparatus 400, such as the electronics, the linear actuator 418, the light source 404, and/or the camera 402. As shown, the power source 415 is powering the electronics. Further, a personal computer 417, which can be in communication with the electronics and/or the camera 402, for data communication and/or for providing power. The communication can be wired, wireless, or other known ways for providing such communication and/or power.

Figure 6:
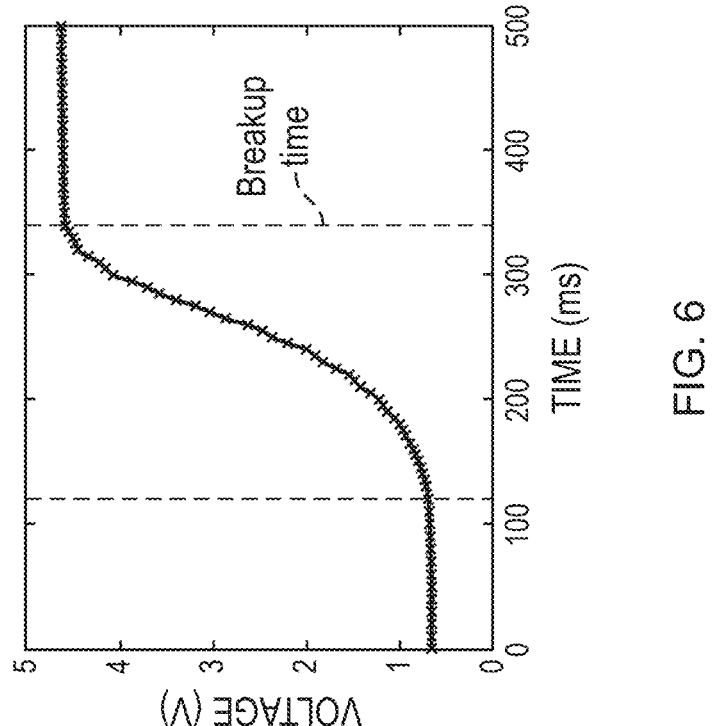
FIG. 6 is a graph of an example voltage response as a function of time for an analog polymer fluid tested, polyethylene oxide (PEO) ($10^6$ g/mol) 4% by weight.

The duration from sample stretching until break-up is the break-up time, which can be extrapolated from the monitored voltage and resistance readings of the circuit as a function of time. This was described above with respect to FIG. 4B, and is further illustrated in FIG. 6. As shown, for FIG. 6, the break-up time is approximately 200 ms as the voltage moves from its low amount (e.g., at a time akin to the first point in time 350a) to its highest amount (e.g., at a time akin to the third point in time 350c).

This circuit modality can be used independent of the imaging modality or in combination with the imaging modality to measure rheological properties of the fluid. Monitoring the filament diameter evolution over time to determine extensional properties using capillary breakup can be especially challenging for low relaxation time fluids or low viscosity fluids. The dual modality of the present disclosure is advantageous over prior art, which uses a single modality of capillary breakup.

The temporal change in resistance and voltage over time can provide information on the breakup time of the fluid, as shown in the embodiments provided for herein and described functionality of the integrated circuit system. This gives an approximation of relaxation time, independent of sample salinity and viscosity of the sample. Therefore, this can be applied to a wide range of samples (e.g., fluids) of interest. In this scenario, salinity of the component does not affect the breakup time measurement because the thread reaches thin diameters, which can translate to resistances, or inversely conductivities, which can be several orders of magnitude higher than the baseline conductivity of the fluid induced by salinity. However, in the initial loading process of the sample volume between the plates when the thread is relatively large (lowest resistance), this initial configuration provides information on the electrical conductivity of the fluid bulk, and hence, overall salinity of a given fluid. Moreover, the electronic components of the system, namely the chosen resistances in the system, can be varied along with the delivered voltage to enable a more sensitive reading of conductivity, depending on the application. This may be of interest in biological or healthcare applications, for example, where salinity of bodily fluids can reflect patient health status.

Figure 7:
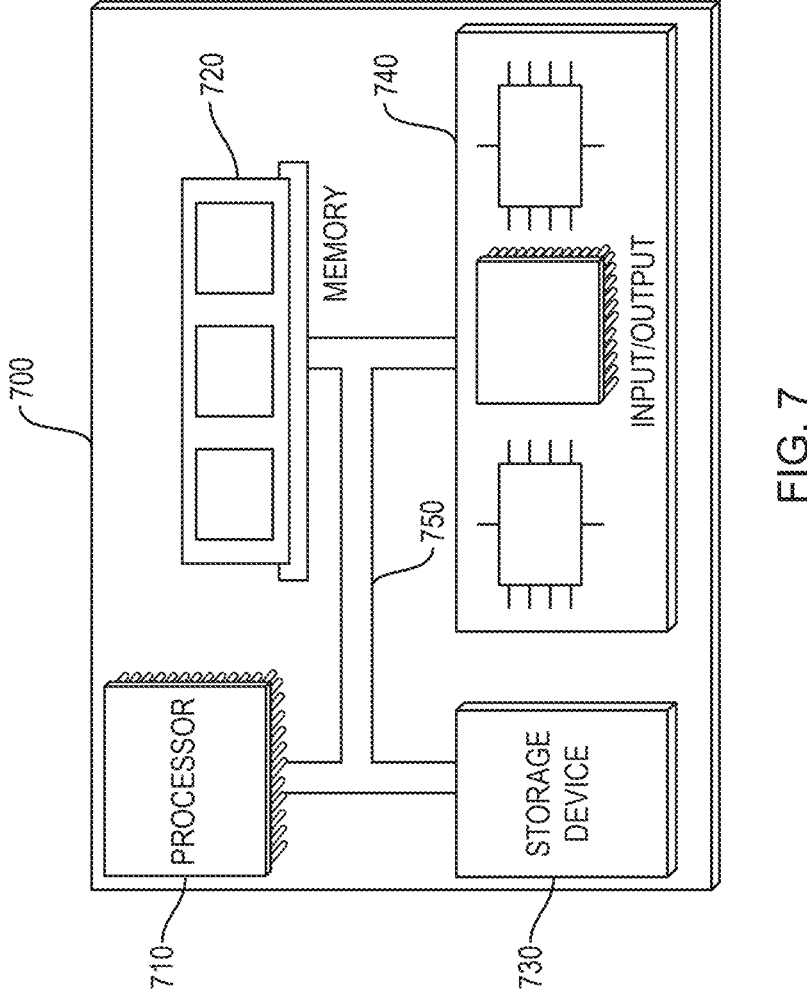
FIG. 7 is a schematic representation of a computer system upon which the methods described herein can be performed.

The operation of the apparatuses and systems disclosed herein, and related methods, including but not limited to the processes for measuring extensional rheological properties, can be performed by at least one processor and/or controller that can be part of the disclosed apparatuses (e.g., the apparatuses 100, 400) and systems (e.g., the system 200) and/or can be in communication with such apparatuses and systems. This was illustrated, for example, in FIG. 5B, in which a personal computer 417 is provided. More specifically, implementation of the present disclosures on a computer readable medium can include a central processing unit (CPU), memory, and/or support circuits (or I/O), among other features. In embodiments having a memory, that memory can be connected to the CPU, and may be one or more of a readily available memory, such as a read-only memory (ROM), a random access memory (RAM), floppy disk, hard disk, cloud-based storage, or any other form of digital storage, local or remote. Software instructions, algorithms (e.g., the processes for measuring extensional rheological properties disclosed herein), and data can be coded and stored within the memory for instructing the CPU. Support circuits can also be connected to the CPU for supporting the processor in a conventional manner. The support circuits may include conventional cache, power supplies, clock circuits, input/output circuitry, and/or subsystems, and the like. Output circuitry can include circuitry allowing the processor to control the linear actuator system (e.g., the systems 118, 418), the plates (e.g., the plates 110, 112, 410 412), in whole and/or in part, as well as other components of a rheometer and/or systems associated with the same (e.g., the camera 102, 402, the light source 104, 404, electronics, etc.). A non-limiting one embodiment of a computer system 700 with which the present disclosures can be used and/or implemented is illustrated in FIG. 7. Such a computer system can also be used to operate the app, as provided for herein.

More particularly, FIG. 7 is a block diagram of one exemplary embodiment of a computer system 700 upon which the present disclosures can be built, performed, operated, trained, etc. For example, any of the processes, measurements, and calculations provided for herein can be implemented by way of the computer system 700. The system 700 can include a processor 710, a memory 720, a storage device 730, and an input/output device 740. Each of the components 710, 720, 730, and 740 can be interconnected, for example, using a system bus 750. The processor 710 can be capable of processing instructions for execution within the system 700. The processor 710 can be a single-threaded processor, a multi-threaded processor, or similar device. The processor 710 can be capable of processing instructions stored in the memory 720 or on the storage device 730. The processor 710 may execute one or more of the operations described herein.

The memory 720 can store information within the system 700. In some implementations, the memory 720 can be a computer-readable medium. The memory 720 can, for example, be a volatile memory unit or a non-volatile memory unit. In some implementations, the memory 720 can store information related to various information and/or images that are being compared, among other information.

The storage device 730 can be capable of providing mass storage for the system 700. In some implementations, the storage device 730 can be a non-transitory computer-readable medium. The storage device 730 can include, for example, a hard disk device, an optical disk device, a solid-date drive, a flash drive, magnetic tape, and/or some other large capacity storage device. The storage device 730 may alternatively be a cloud storage device, e.g., a logical storage device including multiple physical storage devices distributed on a network and accessed using a network. In some implementations, the information stored on the memory 720 can also or instead be stored on the storage device 730.

The input/output device 740 can provide input/output operations for the system 700. In some implementations, the input/output device 740 can include one or more of network interface devices (e.g., an Ethernet card), a serial communication device (e.g., an RS-232 10 port), and/or a wireless interface device (e.g., a short-range wireless communication device, an 802.7 card, a 3G wireless modem, a 4G wireless modem, a 5G wireless modem). In some implementations, the input/output device 740 can include driver devices configured to receive input data and send output data to other input/output devices, e.g., a keyboard, a printer, and/or display devices. In some implementations, mobile computing devices, mobile communication devices, and other devices can be used.

In some implementations, the system 700 can be a microcontroller. A microcontroller is a device that contains multiple elements of a computer system in a single electronics package. For example, the single electronics package could contain the processor 710, the memory 720, the storage device 730, and/or input/output devices 740.

Additional Data and Information Demonstrating the Usefulness of the Rheometers Provided for Herein Table 1 below provides a comparison of a diameter resolution with calibration wires for each of an existing CaBER device or instrument with an exemplary embodiment of the present disclosure, referred to herein as a Mini Portable Rheometer (MPR) device or instrument, such as the rheometer 100 of FIG. 1A. Table 2 below provides a comparison of relative difference between the measured and true calibration wire diameter for an existing CaBER device and an MPR of the present disclosure, e.g., the rheometer 100 of FIG. 1A.

TABLE 1

| Comparison of CaBER Device and Mini Portable Rheometer diameter resolution with calibration wires. | | |
|---|---|---|
| Calibration wire diameter (mm) | CaBER detected diameter (mm) | iPhone image measured diameter (mm) |
| 0.005 | 0.0062 ± 0.001 | 0.0045 ± 0.001 |
| 0.0290 | 0.0274 ± 0.001 | 0.0270 ± 0.001 |
| 0.0590 | 0.0630 ± 0.001 | 0.0532 ± 0.001 |
| 0.119 | 0.1230 ± 0.002 | 0.1154 ± 0.002 |
| 0.250 | 0.2570 ± 0.002 | 0.2570 ± 0.002 |
| 0.500 | 0.5020 ± 0.002 | 0.4912 ± 0.002 |
| 1.000 | 1.0010 ± 0.003 | 0.9904 ± 0.002 |
| 3.000 | 2.9912 ± 0.001 | 3.0162 ± 0.002 |

TABLE 2

| Relative difference between measured and true calibration wire diameter for CaBER Device and Mini Portable Rheometer | | |
|---|---|---|
| Calibration wire diameter (mm) | CaBER RD (%) | iPhone image RD (%) |
| 0.005 | 24 | 10 |
| 0.0290 | 6 | 7 |
| 0.0590 | 7 | 10 |
| 0.119 | 3 | 3 |
| 0.250 | 3 | 3 |
| 0.500 | 0.4 | 2 |
| 1.000 | 0.1 | 1 |
| 3.000 | 0.29 | 0.5 |

More specifically, using eight (8) calibration wires provided with the commercial CaBER device, the detected diameter of the CaBER device and the handheld device used in the portable rheometer were compared. The relative difference can be calculated between the mean diameter for each device and the true diameter value. The handheld device (with adapted convex lens) of the present disclosure may tend to underestimate the diameter due to, for example, to "spurious resolution," whereby the darker parts of an object, in this case the thread edges, become light and vice versa. For the CaBER device, when there is no object in the laser field, the laser micrometer should ideally read 0 mm but instead values detected ranged from about −0.01 mm to about 0.003 mm. This may introduce an error in the detected diameters of the CaBER device between 0 microns and about 10 microns. For both devices, the relative difference generally increased with reduced wire diameter as both devices approach their instrument limitations (i.e., resolution for laser micrometer or pixel resolution for camera).

The device performance can be evaluated, for example, with standardized analog polymer solutions made from polyethylene oxide (PEO) solutions. In some instances, solutions had varying viscosities and elasticities to test a range of physical properties. In addition to varying the rheological properties of the analog fluids, the fluid conductivity can also be varied to represent the range in mucosalivary fluid. Conductivity can be of interest given the second mode of the device to quantify elasticity.

In order to evaluate the performance of the MPR device, the measured relaxation times of analog fluids and mucosalivary fluid samples on the device were compared to measurements done on the CaBER device. For the relaxation time measurement, the optical mode of the device can be used, which can involve capillary breakup of the fluid thread, and which can be simultaneously monitored and recorded by the adapted handheld device. The recorded videos can be analyzed with any basic image processing platform or code, with classical approaches of edge detection (gradient map) at the midpoint of the thread, which extracts the diameter of the thread as a function of time; the pixels can be converted to a length scale using an image calibration and the frames can be converted to time using the frames per second (FPS) of the device. In tests that were conducted in conjunction with the present disclosure, with frame rate of 240 FPS, three relaxation time measurements were done on each device and on each sample. The relaxation time from each were averaged together and a standard deviation was calculated.

Figure 8:
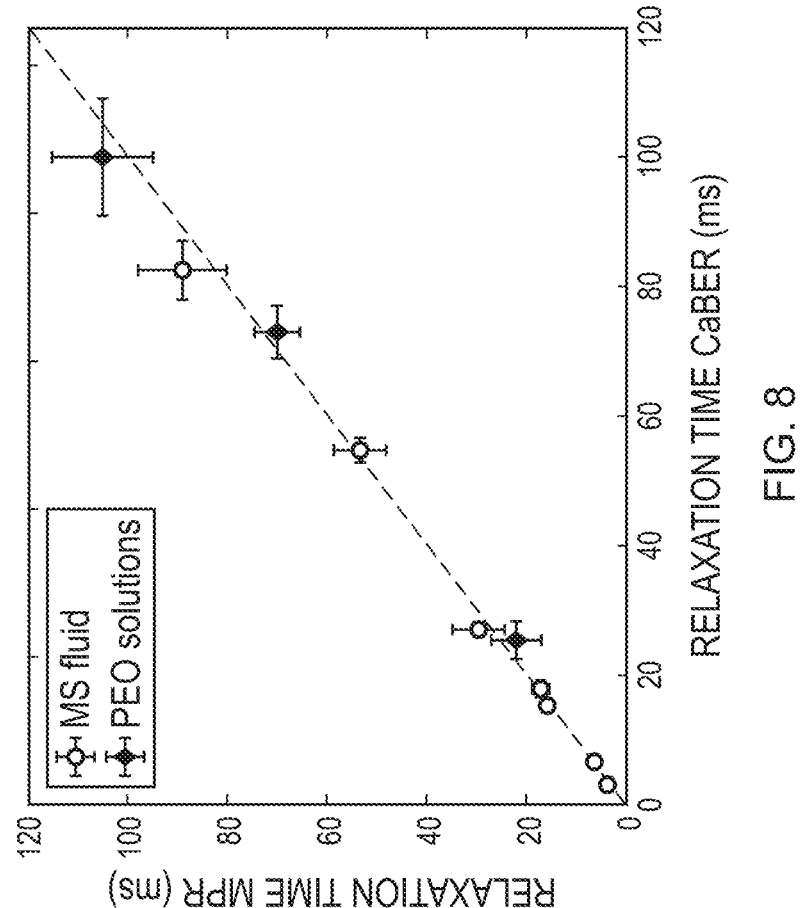
FIG. 8 is a graph of a comparison of relaxation times measured by a rheometer of the present disclosure (referred to herein in some cases as a Mini Portable Rheometer or MPR) and a commercial CaBER device.

FIG. 8 shows the average measured relaxation times on the MPR device versus the average measure relaxation time on the CaBER device. Three measurements were performed on each device. The relaxation time from each measurement were averaged together and a standard deviation was calculated to create errorbars. The dashed line represents the 1-to-1 agreement between the two devices and their respective error bars represent the associated standard deviation for each instrument. Overall, an agreement between the two device measurements is evident. The lowest measured relaxation time on both devices was approximately 3 ms, which was a PEO solution ($10^6$ g/mol) 0.1% by weight and the highest measured relaxation time was a mucosalivary fluid sample that had a measured relaxation time of approximately 100 ms. An increase in the standard deviation of both measurements with increasing relaxation time was also observed.

Figure 9:
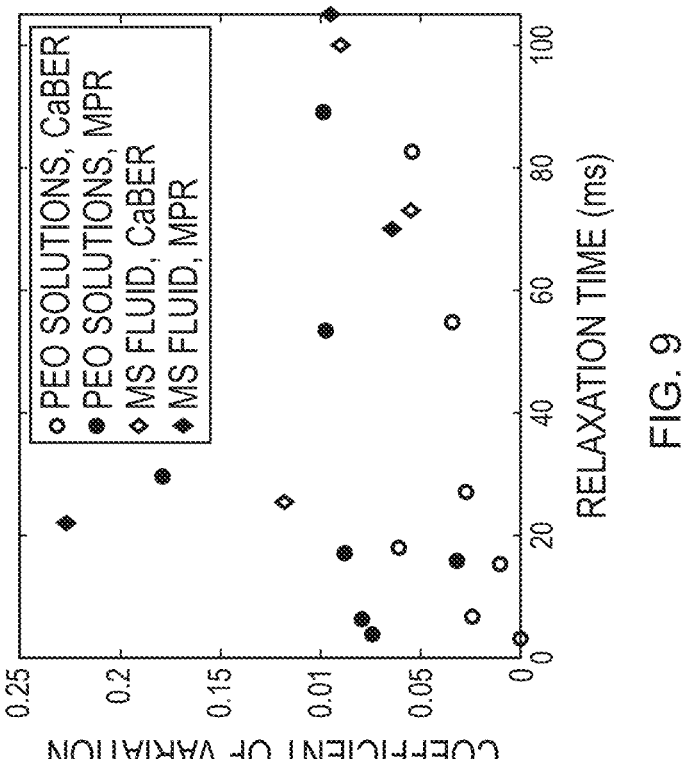
FIG. 9 is a graph of a coefficient of variation of the relaxation time measurement as a function of the average relaxation time measured for both instruments of FIG. 8 for analog fluids and MS fluid corresponding to measurements shown in FIG. 8.

A ratio of the standard deviation to the average relaxation time for each fluid solution tested (three measurements done on three samples from same solution) produced a coefficient of variation (CV), which is plotted as a function of the relaxation time in FIG. 9. As shown, FIG. 9 illustrates a graph of a CV of the relaxation time measurement as a function of the average relaxation time measured for both instruments for analog fluids and MS fluid corresponding to measurements shown in FIG. 8. The coefficient of variation is determined by dividing the standard deviation by the average measured relaxation time. Different symbols distinguished the CV in the MPR device and the CaBER device, and the two shades distinguished between analog fluid or MS sample corresponds to measurements shown in FIG. 8. The CV for both devices was approximately in the range of about 0 to about 0.25, which indicated repeatability of the measurement on both devices. The MPR device consistently had higher CV than the CaBER device, which can be contributed by its higher error in diameter detection.

The second mode of the device was additionally explored by monitoring the voltage readings of the integrated circuit during simultaneous stretching of the fluid between the two plates. The dynamic change in voltage over time was recorded and the delay between closed circuit and open response was related to the breakup time of the fluid thread. In brief, the voltage changes with the evolution of the thread at least because the circuit resistance is related to the length and cross section geometry of the resistor in the circuit. As the length of the thread increases, the radius decreases dramatically, causing temporal changes in resistance and changes in the output voltage.

Figure 10:
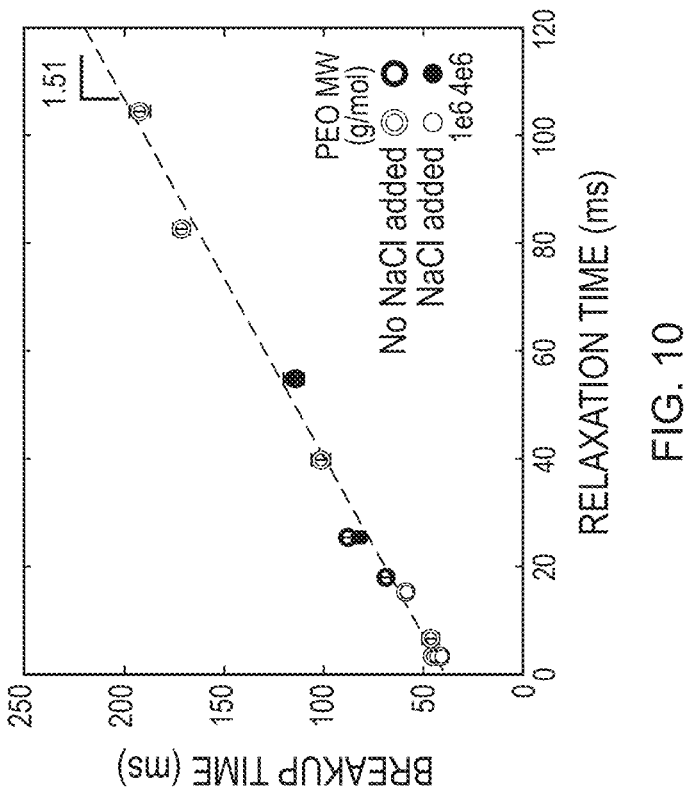
FIG. 10 is a graph of measured fluid breakup time with a rheometer of the present disclosure (e.g., a Mini Portable Rheometer or MPR) versus an average measured CaBER relaxation time.

FIG. 10 illustrates a graph of measured fluid breakup time with an MPR device versus an average measured CaBER device relaxation time. The results of FIG. 10 are better understood in view of, for example, the graphs 580*a*, 580*b* of FIG. 4B because those graphs provide examples of how breakup time can be quantified; FIG. 10 summarizes the measured breakup times with the respective devices and their relationship to relaxation time. Breakup time was measured five (5) times for each solution tested and their average and error were plotted as a function of the relaxation time. The results illustrate a linear relationship between breakup time and relaxation time. The stretching rate in this study was kept at a constant $\frac{1}{200}$ s$^{-1}$ for all tests. Different stretching rates would correspond to different slopes for the linear relation between breakup time and relaxation time. The dashed line representing the best fit line that has a slope of 1.51.

Increasing the stretching rate may be necessary, for example if the fluid is highly elastic (high De number), then its corresponding breakup length at slower plate velocities may be larger than the height of the instrument; therefore, velocities may be adjusted, for example, according to the limitations of the geometry of the instrument and the range of fluid elastic properties tested.

Figures 11, 12:
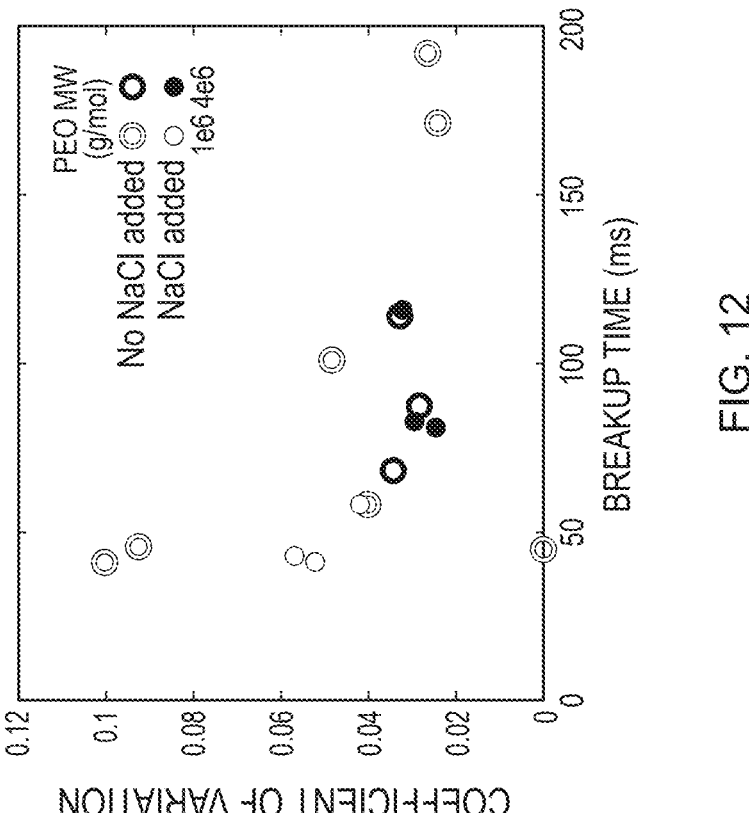
FIG. 11 is a graph of non-dimensional fluid breakup time as a function of measured fluid conductivity for three (3) PEO solutions.
FIG. 12 is a graph of coefficient of variation as a function of measured breakup time.

FIG. 11 illustrates a graph of non-dimensional fluid breakup time as a function of measured fluid conductivity for three (3) PEO solutions. In this case, the break up time is non-dimensionalized by dividing the breakup times of PEO solutions by their respective breakup time ($t_{b,0}$) while no NaCl added to the solution. The standard deviation is divided by the average breakup time corresponding to the solution that is equivalent to a coefficient of variation. The error bars shown in the plot illustrates the spread of measurement from the non-dimensional breakup time. Upon closer examination of the effect of increased conductivity, as illustrated in FIG. 11, an insignificant decrease in the breakup time with increasing conductivity of the solution can be observed. Within the range of conductivities studied, the breakup time can decrease no more than about 10% of the original breakup time value or breakup time for the solution without NaCl added. In addition, the variation of the measurement is approximately in the range of about 0.05 or about 5% of the average measurement supporting reliable measurement for fluids with conductivities between 0 and about 5000 μS/cm.

FIG. 12 illustrates a graph of coefficient of variation as a function of measured breakup time. The graph includes five (5) breakup time measurements per solution that were tested and the fluid break times are averaged together. The coefficient of variation is determined by dividing the standard deviation by the average measured breakup time. The breakup time is determined from the output voltage reading over time of fluid stretching. The variability in measurement for all solutions tested with this mode of the instrument can be quantified, as shown. Variability for the fluid break up time (three measurements done on three samples from same solution) can be between 0 and about 0.12, which was a lower variability than the variability in the capillary breakup mode of the instrument. Higher variability in the capillary breakup mode is not only due to the error associated with the camera, but additionally due to inertial effects, which affect the thread behavior. This is due, at least in part, to the stretching and abrupt stop of the top plate to its final height. The second mode of the instrument relied on the response of the device monitoring the voltage changes in the circuit system, as opposed to the limitation of the first mode, which was the resolution of the camera. In the MPR device, the output voltage can be monitored, for example, with measurements, such as measurements taken every 1 ms.

The present disclosures can be applicable to a variety of industries and types of companies. For example, rheology instrumentation, pharmaceutical and medical companies, food safety and environmental monitoring instrumentation companies, academic and research institutions, and clinical settings are some non-limiting examples of the types of companies and other entities that can benefit from the present disclosures.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. An apparatus for measuring rheological properties, comprising:
   a sample analyzer configured to handle a sample in a manner that allows rheological properties of the sample to be analyzed;
   at least one of a camera configured to observe the sample being analyzed or a camera receiver configured to position a camera to observe the sample being analyzed;
   at least one of a light source configured to direct light towards the sample to be analyzed or a light source receiver configured to position a light source to direct light towards the sample to be analyzed;
   an integrated electrical circuit configured to apply a current through the sample; and
   a controller configured to each of:
      a) at least one of: (i) instruct that data indicative of rheological properties of the sample being handled be determined by the at least one camera or a camera associated with the camera receiver, or (ii) receive data indicative of rheological properties of the sample being handled from the at least one camera or a camera associated with the camera receiver;

b) at least one of: (i) instruct that data indicative of rheological properties of the sample being handled be determined based on the current applied to the sample by the integrated electrical circuit, or (ii) receive data indicative of rheological properties of the sample being handled based on the current applied to the sample by the integrated electrical circuit; and
      c) determine one or more rheological properties of the sample being handled based on measured break-up times of the sample being handled, the measured break-up times being derived from: (i) the at least one camera or the camera associated with camera receiver; and (ii) at least one of a detected voltage or the current applied to the sample by the integrated electrical circuit.

2. The apparatus of claim 1, wherein the sample analyzer comprises a linear actuator system.

3. The apparatus of claim 2, wherein the linear actuator system comprises:
   a first plate; and
   a second plate moveable axially away from the first plate, wherein the first and second plate are configured to receive the sample therebetween such that as the second plate moves axially away from the first plate, the sample stretches.

4. The apparatus of claim 3, wherein the linear actuator system is configured to stretch the sample until it breaks.

5. The apparatus of claim 3, wherein the linear actuator system is configured to stretch the sample until a predetermined gap is formed between the first and second plates.

6. The apparatus of claim 1, wherein the at least one light source is incorporated in a camera, the camera being the camera of the apparatus or a camera received by the camera receiver.

7. The apparatus of claim 1, wherein the integrated electrical circuit is configured such that the current applied through the sample fails to alter a thinning behavior of the sample.

8. The apparatus of claim 1, wherein the apparatus is sized to be portable.

9. A system for measuring rheological properties, comprising:
   the apparatus of claim 1; and
   an application configured to communicate with the controller and allow for use of the apparatus without any calibration being performed by a user of the system.

10. The system of claim 9, wherein the application is configured to set an image calibration associated with the at least one camera or a camera associated with the camera receiver based on dimensions associated with one or more components of the sample analyzer.

11. The system of claim 10, wherein the one or more components of the sample analyzer comprise:
   a first plate; and
   a second plate moveable axially away from the first plate, wherein the first and second plates are configured to receive the sample therebetween such that as the second plate moves axially away from the first plate, the sample stretches, and
   wherein the dimensions associated with the one or more components of the sample analyzer comprises a radius of each of the first and second plates.

12. The system of claim 9, wherein at least one of the controller or the application are configured to provide real-time adjustments of extensional velocity associated with the sample analyzer based on at least one of data received from at least one of the at least one camera or a camera associated with the camera receiver or the integrated electrical circuit or data already stored in the controller or the application related to the same.

13. The apparatus of claim 1, wherein the integrated electrical circuit is configured to apply the current at a constant value through the sample, and the controller is further configured to detect that the sample breaks in response to a detected voltage increase in the integrated electrical circuit.

14. The apparatus of claim 13, wherein the detected voltage increases from 0.5 volts to 4 volts when the sample breaks.

15. The apparatus of claim 1, wherein the controller is further configured to measure an increase in output voltage when measured break-up times of the sample being handled occur.

16. The apparatus of claim 15, wherein the controller is further configured to determine measured break-up times of the sample being handled while conductivity is increased, the measured break-up times of the sample being handled being constant when the conductivity is increased in a range between 0 and 5000 µS/cm.

17. The apparatus of claim 1, wherein the camera is configured to observe the sample being analyzed simultaneously with the integrated electrical circuit applying the current through the sample.

18. The apparatus of claim 1, wherein the controller is configured to perform a) and b) independent of one another and in combination with one another to measure rheological properties of the sample.

\* \* \* \* \*